A. R. BAKER.
ADJUSTABLE MOSQUITO CANOPY OR NET.

No. 185,157.  Patented Dec. 12, 1876.

Witnesses:
H. Whitney
H. P. Hood

Inventor:
Albert R. Baker
Per E. D. Smith
his Attorney

THE GRAPHIC CO. N.Y.

UNITED STATES PATENT OFFICE.

ALBERT R. BAKER, OF INDIANAPOLIS, INDIANA.

IMPROVEMENT IN ADJUSTABLE MOSQUITO CANOPIES OR NETS.

Specification forming part of Letters Patent No. 185,157, dated December 12, 1876; application filed August 25, 1876.

*To all whom it may concern:*

Be it known that I, ALBERT R. BAKER, of Indianapolis, county of Marion, State of Indiana, have invented a new and useful Improvement in Adjustable Folding Screens for Beds, of which the following is a description, reference being had to the accompanying drawings.

The object of my invention is to provide a bed with an adjustable folding screen, in such a manner that when in use the screen will cover the whole bed, and when not in use can be folded up out of the way; and my invention consists in attaching one, two, or more frames upon hinged or swivel bearings, in such a manner as to be adjustable in covering the bed, and capable of being folded up when not in use, as set forth in the claims.

Figure 1:
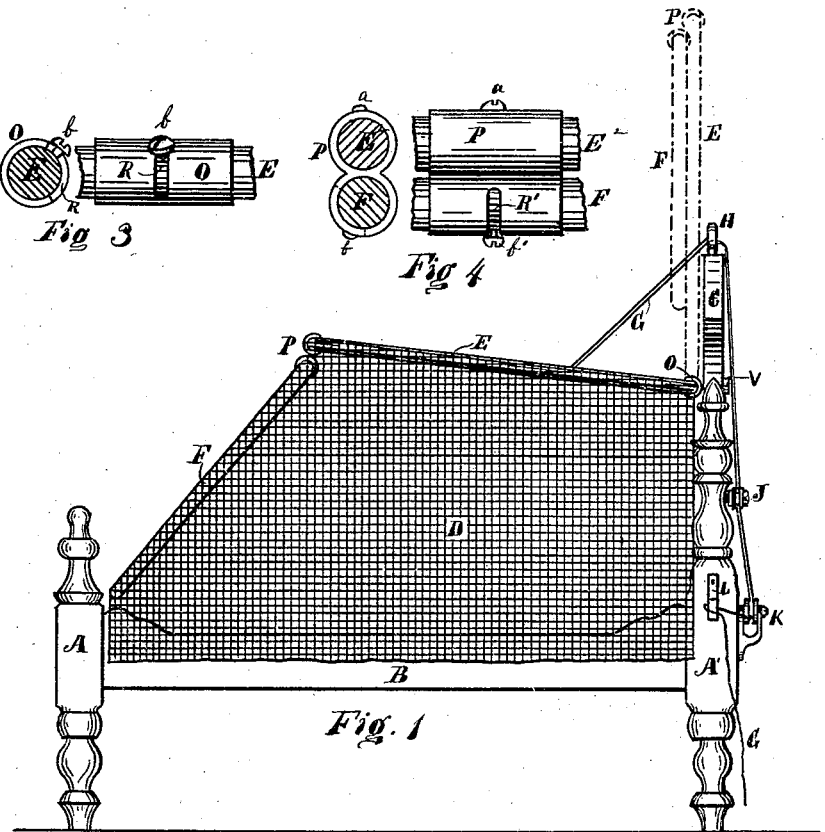
Figure 2:
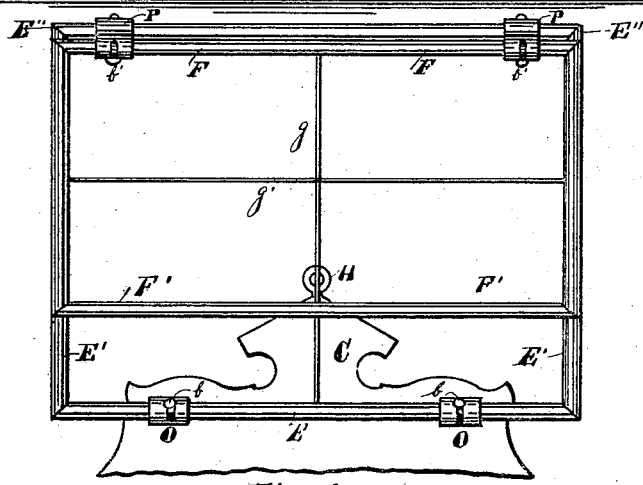
Figure 3:
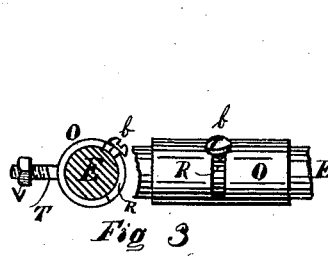
Figure 4:
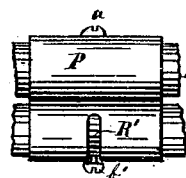

Figure 1 represents a side elevation of a bed to which is attached my improved adjustable screen. Fig. 2 is a sectional front view of the head-board of a bed, and shows the manner in which my adjustable screens are attached. Figs. 3 and 4 are different views of the hinges or swivel-joints on which the screen-frames operate.

A, A', and B represent any ordinary bedstead, and to the head-board C are secured two metallic ring bands or hinges, O O. These metallic bands are shown in Fig. 3 by a sectional and front view. The bands O are provided with screws T and nuts V, and are secured to the head-board C, as shown in Figs. 1 and 2, the screws T passing through the head board, and secured by the nuts V, thus holding them in their proper positions. The central parts of the bands O are perforated with a slot, R, and the bands are placed on the round end bar E of the frame $E^1 E^2$ before being secured to the bed, and screws $b$ are inserted in the bar E through the slot R, to govern the movement of the frame E $E^1$ $E^2$, and to prevent it from falling down on the bed. On the bar $E^2$ of the frame, that is attached to the head-board C, are other bands, P. (Shown in Fig. 4.) These bands may be made double, as shown in Fig. 4, or like those in Fig. 3. If as in Fig. 3, the screw T passes through the bar $E^2$; but if constructed as in Fig. 4, the upper cylinder P encircles the bar $E^2$, and is secured by the screw $a$ in any desired position, and the lower cylinder encircles the bar E of the frame F F' in a loose manner, so as to allow the frame F F' to work freely therein, the extent of movement of which is regulated by screws $b'$ in the slots R', similar to those already described, thus allowing the frame F F' to swing freely on the outer end of frame E $E^1$ $E^2$. The frames are each provided with wire cross-bars $g$ $g'$, to help strengthen the frame, and to support the gauze which covers both frames. The gauze also extends downward at each side of the bed, to prevent insects from entering beneath the screen. At the top of the head-board C is a screw-eye or sheave, H, and attached to the head-board at the rear is a sheave, J, and also another sheave, K, is attached to the rear of one of the head-board posts, as at K. The cord G is attached to the cross-bars of wire $g$ $g'$, near the center of frame E $E^1$ $E^2$, and passes through the screw-eye or sheave H, over the sheaves J and K, and is made fast to a cleat, L, on the side of the bed-post A'; or it may be secured in any desirable manner; or the screen may be secured by means of a hook when elevated, and the cord G dispensed with.

The adjustable screens being attached to the head-board C, as described, the frame E $E^1$ $E^2$ may be swung downward into position, and the frame F F' can then be adjusted to the foot of the bed, as shown in Fig. 1. The screen D completely envelops the bed and prevents the entrance of insects. When it becomes necessary to raise the screen for any purpose, the cord G is drawn forward, thus causing the screen-frames E $E^1$ $E^2$ and F F' to be folded up on the head-board, as indicated by the dotted lines, and it is there secured by fastening the cord G to the cleat or other fastening L, as shown in Fig. 1. Where the head-board is not sufficiently high to receive the screen, posts or cleats may be secured to the head-board and the screen attached thereto.

What I claim as new, and wish to secure by Letters Patent, is—

1. An adjustable folding-screen device for beds, consisting of the screen-frames E $E^1$ $E^2$ and F F', hinges or pivots O O P P, cord G, screw-eye H, and pulleys J K, arranged to operate in the manner set forth and described.

2. The combination of the two screen-frames E E¹ E² and F F' with the head-board C, in the manner and for the purposes set forth.

3. The combination of the screen-frame E E¹ E² and screen-frame F F', in the manner and for the purposes set forth.

4. The cylinder hinge-band O, having the slot R and screw T, and applied to the head-board C of the bed and frame E E¹ E², in the manner set forth and described.

5. The double cylindrical hinge-band P, having its lower cylinder formed with slot R', and adapted to be used in connection with the two frames E E¹ E² and F F', in the manner and for the purposes set forth and described.

In testimony whereof I have signed my name to this specification in the presence of two subscribing witnesses.

ALBERT R. BAKER.

Witnesses:
E. O. FRINK,
E. C. WHITNEY.